United States Patent
Kitagawa

(10) Patent No.: US 9,903,287 B2
(45) Date of Patent: Feb. 27, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Eiki Kitagawa, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 21 days.

(21) Appl. No.: 15/042,379

(22) Filed: Feb. 12, 2016

(65) Prior Publication Data

US 2016/0237923 A1 Aug. 18, 2016

(30) Foreign Application Priority Data

Feb. 17, 2015 (JP) .................. 2015-028873
Sep. 28, 2015 (JP) .................. 2015-189747

(51) Int. Cl.
| | |
|---|---|
| *F02D 35/02* | (2006.01) |
| *F02D 41/24* | (2006.01) |
| *F02D 41/40* | (2006.01) |
| *F02D 37/02* | (2006.01) |
| *G01M 15/11* | (2006.01) |
| *F02D 41/06* | (2006.01) |
| *F02P 5/153* | (2006.01) |

(52) U.S. Cl.
CPC ......... *F02D 35/023* (2013.01); *F02D 35/028* (2013.01); *F02D 37/02* (2013.01); *F02D 41/06* (2013.01); *F02D 41/2416* (2013.01); *F02D 41/40* (2013.01); *F02P 5/153* (2013.01); *G01M 15/11* (2013.01); *Y02T 10/44* (2013.01); *Y02T 10/46* (2013.01)

(58) Field of Classification Search
CPC .... F02D 35/023; F02D 41/06; F02D 41/2416; F02D 41/40; F02D 37/02; F02D 35/028; F02P 5/153; G01M 15/11; Y02T 10/46; Y02T 10/44

See application file for complete search history.

(56) References Cited

U.S. PATENT DOCUMENTS

| | | |
|---|---|---|
| 4,622,939 A | 11/1986 | Matekunas |
| 5,544,635 A | 8/1996 | Hara et al. |
| | (Continued) | |

FOREIGN PATENT DOCUMENTS

| | | |
|---|---|---|
| EP | 2119894 A1 | 11/2009 |
| JP | 2008-069713 A | 3/2008 |
| | (Continued) | |

*Primary Examiner* — Joseph Dallo
*Assistant Examiner* — Kurt Liethen
(74) *Attorney, Agent, or Firm* — Andrews Kurth Kenyon LLP

(57) ABSTRACT

A control apparatus for an internal combustion engine is configured to: calculate measured data for MFB in synchrony with crank angle based on in-cylinder pressure detected by an in-cylinder pressure sensor; execute SA-CA10 feedback control and CA50 feedback control based on a measured CA10 and a measured CA50 that are calculated based on the measured data; execute engine control based on a degree of correlation between the MFB measured data and the reference data that corresponds thereto; and generate reference data for a combustion period by linear interpolation and linear extrapolation based on a target CA50 and a specified CA10.

5 Claims, 6 Drawing Sheets

(56) References Cited

U.S. PATENT DOCUMENTS

| | | | |
|---|---|---|---|
| 7,073,485 B2 | 7/2006 | Truscott et al. | |
| 8,046,156 B2 * | 10/2011 | Moriya | F02D 13/0261 |
| | | | 123/406.41 |
| 8,291,751 B2 | 10/2012 | Wang et al. | |
| 8,380,422 B2 * | 2/2013 | Moriya | F02D 11/10 |
| | | | 123/492 |
| 8,528,521 B2 * | 9/2013 | Landsmann | F02D 35/023 |
| | | | 123/435 |
| 2008/0319632 A1 * | 12/2008 | Miyashita | F02D 35/023 |
| | | | 701/102 |

FOREIGN PATENT DOCUMENTS

| | | | | |
|---|---|---|---|---|
| JP | 2011-106334 A | 6/2011 | | |
| WO | 2009040632 A2 | 4/2009 | | |
| WO | WO 2009040632 A2 * | 4/2009 | | F02D 11/10 |

\* cited by examiner

Time of semi-misfiring

Time of misfiring

CONTROL APPARATUS FOR INTERNAL COMBUSTION ENGINE

CROSS-REFERENCE TO RELATED APPLICATIONS

This present application claims priority to Japanese Patent Application Nos. 2015-028873 and 2015-189747 filed on Feb. 17, 2015 and Sep. 28, 2015, respectively, which are incorporated herein by reference in their entireties.

BACKGROUND

Technical Field

Preferred embodiments relate to a control apparatus for an internal combustion engine, and more particularly to a control apparatus for an internal combustion engine that is suitable as an apparatus for controlling an internal combustion engine that includes an in-cylinder pressure sensor.

Background Art

In Japanese Patent Laid-Open No. 2008-069713, a combustion control apparatus for an internal combustion engine that includes an in-cylinder pressure sensor is disclosed. In the combustion control apparatus, data for mass fraction burned that is synchronized with a crank angle is calculated using an in-cylinder pressure sensor and a crank angle sensor, and an actual combustion start point and a combustion center are calculated based on the data. In addition, if a difference obtained by subtracting the actual combustion start point from the combustion center exceeds an upper limit, the combustion control apparatus determines that combustion has deteriorated, and implements a countermeasure for improving combustion, such as increasing the fuel injection amount. Note that, in Japanese Patent Laid-Open No. 2008-069713, as one example, an appropriate value during a period in which mass fraction burned is from 10 to 30 percent is used as the aforementioned actual combustion start point that is a crank angle at a time that combustion is actually started in a cylinder, and, for example, an appropriate value during a period in which mass fraction burned is from 40 to 60 percent is used as the combustion center.

In Japanese Patent Laid-Open No. 2011-106334, a method for estimating a heat release rate in a cylinder using a Wiebe function is disclosed. According to this estimation method, the average in-cylinder pressure and average in-cylinder temperature in a specific period as well as the volumetric efficiency of intake air, the engine speed, the fuel injection amount, the fuel injection pressure and the EGR rate are used as operating condition parameters to estimate the heat release rate.

LIST OF RELATED ART

Following is a list of patent documents which the applicant has noticed as related arts of the present application.
[Patent Document 1]
 Japanese Patent Laid-Open No. 2008-069713
[Patent Document 2]
 Japanese Patent Laid-Open No. 2011-106334

Technical Problem

A waveform of measured data for mass fraction burned changes in accordance with the combustion state (specifically, in accordance with whether or not satisfactory combustion is performed) or in accordance with the environment around the internal combustion engine (for example, the temperature environment). Therefore, if measured data for mass fraction burned can be appropriately analyzed on board, changes in the combustion state or environment can be ascertained and it will be possible to appropriately perform engine control as a countermeasure with respect to such changes.

Here, a crank angle at a time that mass fraction burned is a specified fraction is referred to as a "specified fraction combustion point". The technique disclosed in Japanese Patent Laid-Open No. 2008-069713 compares a difference between measured values at two specified fraction combustion points, namely, the actual combustion start point and the combustion center, with a determination value (upper limit value) to ascertain the combustion state. However, the form of a change in measured data for mass fraction burned differs in accordance with the individual factors that cause a change. Consequently, when only measured values at two specified fraction combustion points are utilized as described above, in some cases a factor that caused a change in the waveform of measured data cannot be accurately identified.

It is considered that if data for mass fraction burned that is to serve as a reference when evaluating measured data for mass fraction burned on board is provided, changes in the combustion state or environment can be ascertained more accurately by comparing measured data for a larger number of specified fraction combustion points than two specified fraction combustion points with the reference data. According to the technique described in Japanese Patent Laid-Open No. 2011-106334, the heat release rate can be estimated using a Wiebe function. Data for mass fraction burned can be generated based on data for the heat release rate that is estimated in this manner, and a technique for doing so is known.

Therefore, it is conceivable to utilize data for mass fraction burned that is generated by the above described technique as reference data. However, as described above, a large number of operating condition parameters are required in order to perform a calculation using a Wiebe function. Consequently, this technique involves a high calculation load. Further, mathematization of combustion is in itself originally difficult, and it is also difficult to extract all the factors that influence combustion. Consequently, it can be said that with this technique it is difficult to ensure the accuracy of the data for mass fraction burned that is generated. Accordingly, it cannot be said that this technique is suitable for implementation with respect to an internal combustion engine.

SUMMARY

Preferred embodiments address the above-described problem and have an object to provide a control apparatus for an internal combustion engine that, in an internal combustion engine in which engine control is performed based on specified fraction combustion points, simply and accurately generates reference data for mass fraction burned, and can perform engine control that serves as a countermeasure that is in accordance with the form of a change in measured data for mass fraction burned while taking the reference data as a standard.

A control apparatus for an internal combustion engine according to preferred embodiments controls an internal combustion engine that includes one or more actuators used for engine control. The control apparatus includes: an in-cylinder pressure sensor configured to detect an in-cylinder pressure; a crank angle sensor configured to detect a crank angle; and a controller. The controller is configured to: calculate measured data for mass fraction burned that is synchronized with crank angle, based on an in-cylinder pressure detected by the in-cylinder pressure sensor and a crank angle detected by the crank angle sensor; calculate a measured value for a specified fraction combustion point that is a crank angle at a time that a mass fraction burned becomes a specified fraction based on the measured data for mass fraction burned; execute a first engine control that, based on a first specified fraction combustion point that is a crank angle at a time that a mass fraction burned becomes a first specified fraction, or based on a first parameter that is defined based on the first specified fraction combustion point, controls any one or a plurality of the one or more actuators so that the first specified fraction combustion point or the first parameter becomes a target value; execute a second engine control that, based on a second specified fraction combustion point that is a crank angle at a time that a mass fraction burned becomes a second specified fraction, or based on a second parameter that is defined based on the second specified fraction combustion point, controls any one or a plurality of the one or more actuators so that the second specified fraction combustion point or the second parameter becomes a target value; and execute a third engine control that, based on a degree of correlation of the measured data for mass fraction burned and reference data for mass fraction burned, controls any one or a plurality of the one or more actuators, wherein the reference date is based on an operating condition of the internal combustion engine. The reference data for mass fraction burned in at least a crank angle period from a 10% combustion point to a 90% combustion point in a combustion period is generated by at least one of linear interpolation and linear extrapolation based on a first target value and a second target value. The first target value is either a target value of the first specified fraction combustion point or the first specified fraction combustion point that is specified based on a target value of the first parameter. The second target value is either a target value of the second specified fraction combustion point or the second specified fraction combustion point that is specified based on a target value of the second parameter. In a case where a first crank angle period that is a crank angle period prior to the combustion period is included in the reference data for mass fraction burned, the reference data for mass fraction burned in the first crank angle period is data in which mass fraction burned is zero percent. In a case where a second crank angle period that is a crank angle period after the combustion period is included in the reference data for mass fraction burned, the reference data for mass fraction burned in the second crank angle period is data in which mass fraction burned is 100 percent.

The first specified fraction combustion point and the second specified fraction combustion point may be specified fraction combustion points within the crank angle period from the 10% combustion point to the 90% combustion point.

The third engine control may be engine warm-up control that raises a temperature of the internal combustion engine, and be executed in a case where a degree of correlation between the measured data and the reference data for mass fraction burned in a prior period that is a crank angle period including a combustion period prior to a third specified fraction combustion point at a time that a mass fraction burned is a third specified fraction is greater than or equal to a first determination value, and a degree of correlation between the measured data and the reference data for mass fraction burned in a latter period that is a crank angle period including a combustion period from and after the third specified fraction combustion point is lower than a second determination value.

The third engine control may be misfiring suppression control that suppresses occurrence of misfiring, and be executed in a case where a degree of correlation between the measured data and the reference data for mass fraction burned in a prior period that is a crank angle period including a combustion period prior to a third specified fraction combustion point at a time that a mass fraction burned is a third specified fraction is lower than a third determination value, and a degree of correlation between the measured data and the reference data for mass fraction burned in a latter period that is a crank angle period including a combustion period from and after the third specified fraction combustion point is lower than a fourth determination value.

A correlation index value that indicates the degree of correlation may be calculated using a cross-correlation function.

According to the control apparatus of preferred embodiments, in an internal combustion engine in which a first engine control that is based on a first specified fraction combustion point or a first parameter that is defined based on the first specified fraction combustion point, and a second engine control that is based on a second specified fraction combustion point or a second parameter that is defined based on the second specified fraction combustion point are executed, reference data for mass fraction burned in at least a crank angle period from a 10% combustion point to a 90% combustion point during a combustion period is generated by at least one of linear interpolation and linear extrapolation based on a first target value and a second target value. The first target value is either a target value of the first specified fraction combustion point or the first specified fraction combustion point that is specified based on a target value of the first parameter. The second target value is either a target value of the second specified fraction combustion point or the second specified fraction combustion point that is specified based on a target value of the second parameter. According to this generation method, reference data for mass fraction burned can be generated simply and accurately while grasping a characteristic of a waveform of data for mass fraction burned. Further, according to the control apparatus of preferred embodiments, a third engine control is executed based on a degree of correlation between reference data generated in this manner and measured data. Therefore, engine control that serves as a countermeasure that is in accordance with the form of a change in measured data for mass fraction burned can be performed in a manner that adopts the reference data as a standard.

DETAILED DESCRIPTION

First Embodiment

A first embodiment of the present invention will be described referring to FIG. 1 to FIG. 8.

[System Configuration of First Embodiment]

Figure 1:
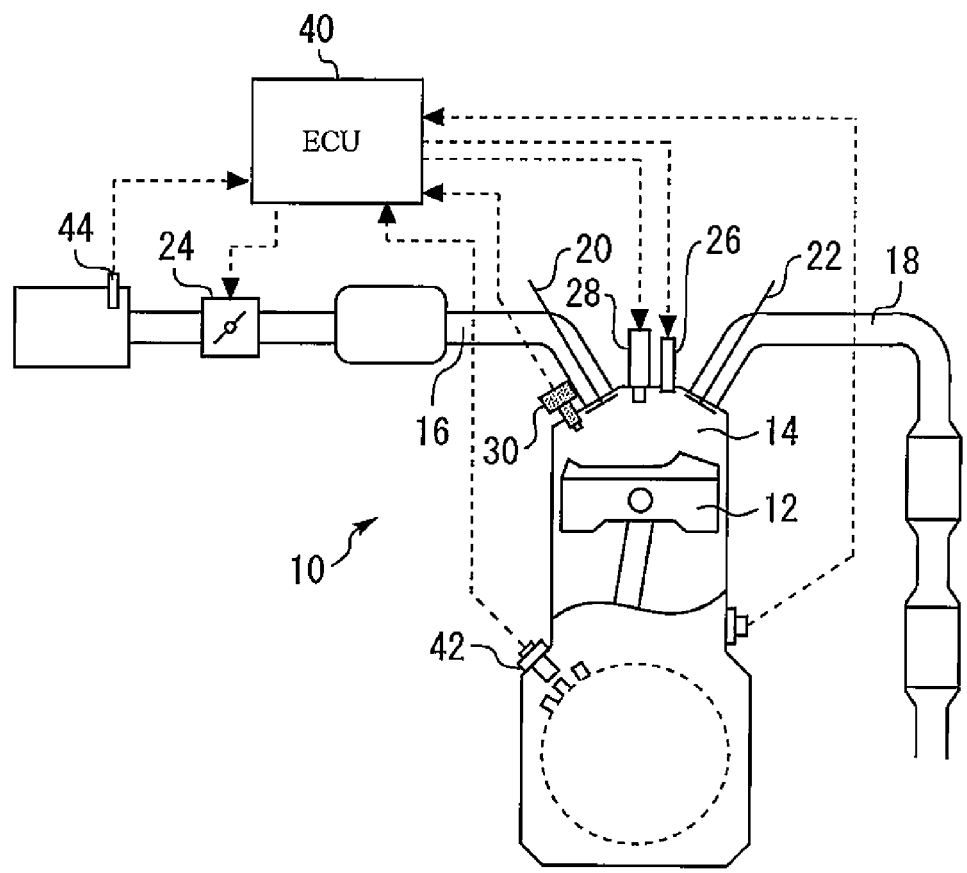
FIG. 1 is a view for describing the system configuration of an internal combustion engine according to a first embodiment of the present invention.

FIG. 1 is a view for describing the system configuration of an internal combustion engine 10 according to a first embodiment of the present invention. The system shown in FIG. 1 includes a spark-ignition type internal combustion engine 10. A piston 12 is provided in each cylinder of the internal combustion engine 10. A combustion chamber 14 is formed on the top side of the piston 12 inside the respective cylinders. An intake passage 16 and an exhaust passage 18 communicate with the combustion chamber 14.

An intake valve 20 is provided in an intake port of the intake passage 16. The intake valve 20 opens and closes the intake port. An exhaust valve 22 is provided in an exhaust port of the exhaust passage 18. The exhaust valve 22 opens and closes the exhaust port. An electronically controlled throttle valve 24 is provided in the intake passage 16. Each cylinder of the internal combustion engine 10 is provided with a fuel injection valve 26 for injecting fuel directly into the combustion chamber 14 (into the cylinder), and an ignition device (only a spark plug is illustrated in the drawings) 28 for igniting an air-fuel mixture. An in-cylinder pressure sensor 30 for detecting an in-cylinder pressure is also mounted in each cylinder.

The system of the present embodiment also includes, in addition to an electronic control unit (ECU) 40, drive circuits (not shown in the drawings) for driving various actuators and various sensors that are described below and the like, as a control apparatus that controls the internal combustion engine 10. The ECU 40 includes an input/output interface, a memory, and a central processing unit (CPU). The input/output interface is configured to take in sensor signals from various sensors installed in the internal combustion engine 10 or the vehicle in which the internal combustion engine 10 is mounted, and to also output actuating signals to various actuators for controlling the internal combustion engine 10. Various control programs and maps and the like for controlling the internal combustion engine 10 are stored in the memory. The CPU reads out a control program or the like from the memory and executes the control program or the like, and generates actuating signals for various actuators based on sensor signals that are taken in.

The sensors from which the ECU 40 takes in signals include, in addition to the aforementioned in-cylinder pressure sensor 30, various sensors for acquiring the engine operating state such as a crank angle sensor 42 that is arranged in the vicinity of a crank shaft (not illustrated in the drawings), and an air flow sensor 44 that is arranged in the vicinity of an inlet of the intake passage 16.

The actuators to which the ECU 40 outputs actuating signals include various actuators for controlling operation of the engine such as the above described throttle valve 24, fuel injection valve 26 and ignition device 28. The ECU 40 also has a function that synchronizes an output signal of the in-cylinder pressure sensor 30 with a crank angle, and subjects the synchronized signal to AD conversion and acquires the resulting signal. It is thereby possible to detect an in-cylinder pressure at an arbitrary crank angle timing in a range allowed by the AD conversion resolution. In addition, the ECU 40 stores a map in which the relation between a crank angle and an in-cylinder volume is defined, and can refer to the map to calculate an in-cylinder volume that corresponds to a crank angle.

[Combustion Control in First Embodiment]

(Calculation of Measured Data for MFB Utilizing in-Cylinder Pressure Sensor)

Figure 2:
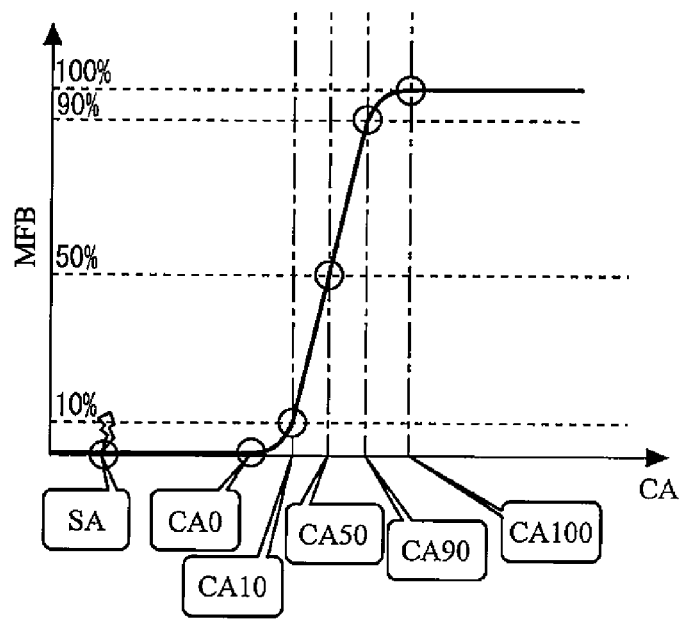
FIG. 2 is a view that represents a waveform of mass fraction burned and a spark timing SA.

FIG. 2 is a view that represents a waveform of mass fraction burned and a spark timing SA. According to the system of the present embodiment that includes the in-cylinder pressure sensor 30 and the crank angle sensor 42, in each cycle of the internal combustion engine 10, measured data for an in-cylinder pressure P can be acquired in synchrony with a crank angle (more specifically, a set of in-cylinder pressures P that are calculated as values for the respective predetermined crank angles). A heat release amount Q inside a cylinder at an arbitrary crank angle θ can be calculated according to the following equations (1) and (2) using the measured data for the in-cylinder pressure P that is obtained and the first law of thermodynamics. Furthermore, a mass fraction burned (hereunder, referred to as "MFB") at an arbitrary crank angle θ can be calculated in accordance with the following equation (3) using the measured data for the heat release amount Q inside a cylinder that is calculated (set of heat release amounts Q calculated as values for the respective predetermined crank angles). Further, measured data for MFB (measured MFB set) that is synchronized with the crank angle can be calculated by executing processing to calculate the MFB at each predetermined crank angle. The measured data for MFB is calculated in a combustion period and in a predetermined crank angle period before and after the combustion period (here, as one example, a crank angle period from a closing timing IVC of the intake valve 20 to an opening timing EVO of the exhaust valve 22).

$$\frac{dQ}{d\theta} = \frac{1}{\kappa - 1} \times \left( V \times \frac{dP}{d\theta} + P \times \kappa \times \frac{dV}{d\theta} \right) \quad (1)$$

$$Q = \sum \frac{dQ}{d\theta} \quad (2)$$

$$MFB = \frac{Q(\theta) - Q(\theta_{min})}{Q(\theta_{max}) - Q(\theta_{min})} \times 100 \quad (3)$$

Where, in the above equation (1), V represents an in-cylinder volume and κ represents a ratio of specific heat of in-cylinder gas. Further, in the above equation (3), $\theta_{min}$ represents a combustion start point and $\theta_{max}$ represents a combustion end point.

According to the measured data for MFB that is calculated by the above method, a crank angle at a time that MFB is a specified fraction α(%) (hereunder, referred to as "specified fraction combustion point", and indicated by attaching "CAα") can be acquired. More specifically, when acquiring the specified fraction combustion point CAα, although it is also possible for a value of the specified fraction a to be successfully included in the measured data for MFB, in a case where the value is not included, the specified fraction combustion point CAα can be calculated by interpolation based on measured data located on both sides of the specified fraction α. Hereunder, in the present description, a value of CAα that is acquired utilizing measured data for MFB is referred to as "measured CAα". A typical specified fraction combustion point CAα will now be described referring to FIG. 2. Combustion in a cylinder starts accompanying an ignition delay after igniting an air-fuel mixture is performed at the spark timing SA. A start point of the combustion ($\theta_{min}$ in the above described equation (3)), that is, a crank angle at a time that MFB starts to rise is referred to as "CA0". A crank angle period (CA0-CA10) from CA0 until a crank angle CA10 that is a time that MFB becomes 10% corresponds to an initial combustion period, and a crank angle period (CA10-CA90) from CA10 until a crank angle CA90 that is a time that MFB becomes 90% corresponds to a main combustion period. Further, according to the present embodiment, a crank angle CA50 that is a time that MFB becomes 50% is used as a combustion center. A crank angle CA100 that is a time that MFB becomes 100% corresponds to a combustion end point ($\theta_{max}$ in the above described equation (3)) at which the heat release amount Q reaches a maximum value. The combustion period is defined as a crank angle period from CA0 to CA100.

(Engine Control Utilizing CAα)

Figure 3:
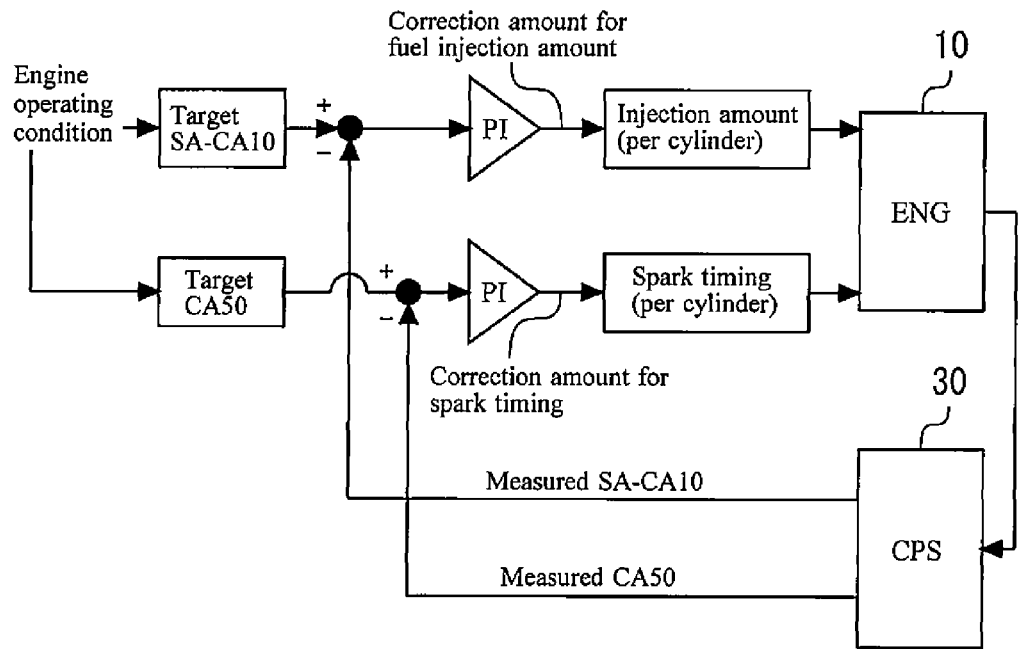
FIG. 3 is a block diagram for describing an outline of two types of feedback control utilizing CA10 and CA50 that an ECU executes.

FIG. 3 is a block diagram for describing an outline of two types of feedback control utilizing CA10 and CA50 that the ECU 40 executes. The engine control that the ECU 40 performs includes control utilizing the specified fraction combustion point CAα. Here, as examples of engine control utilizing the specified fraction combustion point CAα, two types of feedback control that utilize CA10 and CA50, respectively, will be described. According to the present embodiment, these controls are executed during lean-burn operation that is performed at a larger (fuel-leaner) air-fuel ratio than the theoretical air-fuel ratio.

1. Feedback Control of Fuel Injection Amount Utilizing SA-CA10

In this feedback control, CA10 that is the 10% combustion point is not taken as a direct target value, but is instead utilized as follows. That is, in the present description, a crank angle period from the spark timing SA to CA10 is referred to as "SA-CA10". More specifically, SA-CA10 that is a difference obtained by subtracting the spark timing SA from the measured CA10 is referred to as "measured SA-CA10". Note that, according to the present embodiment, a final target spark timing (command value of spark timing in next cycle) after adjustment by feedback control of the spark timing utilizing CA50 as described later is used as the spark timing SA that is used for calculating the measured SA-CA10.

Figure 4:
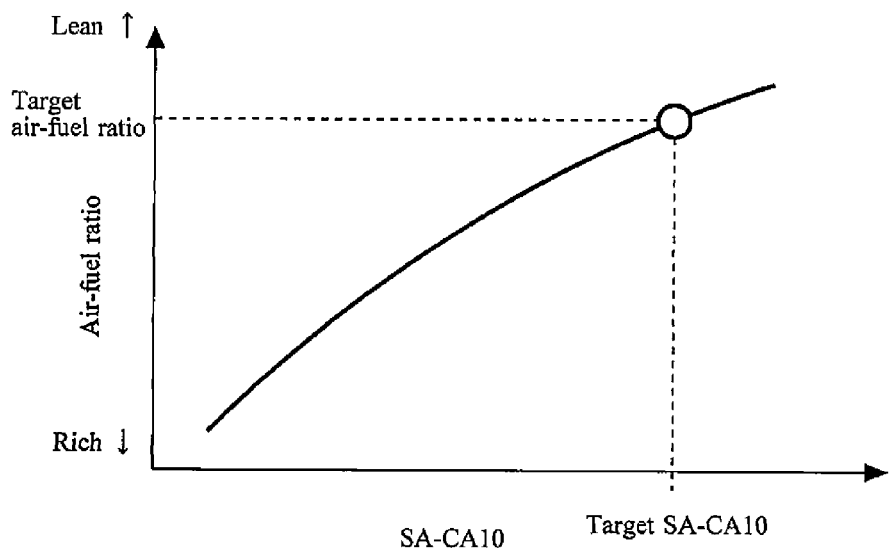
FIG. 4 is a view that represents a relation between air-fuel ratio and SA-CA10.

FIG. 4 is a view that represents a relation between the air-fuel ratio and SA-CA10. This relation is a relation in a lean air-fuel ratio range that is on a lean side relative to the theoretical air-fuel ratio, and is a relation under an identical operating condition (more specifically, an engine operating condition in which the intake air flow rate and engine speed are identical). SA-CA10 is a parameter that represents an ignition delay, and there is a constant correlation between SA-CA10 and the air-fuel ratio. More specifically, as shown in FIG. 4, in the lean air-fuel ratio range, there is a relation that SA-CA10 increases as the air-fuel ratio becomes leaner. Therefore, a target SA-CA10 that corresponds to a desired target air-fuel ratio can be determined by utilizing this relation. In addition, according to the present embodiment a configuration is adopted so that, during lean-burn operation, feedback control is executed that adjusts a fuel injection amount so that the measured SA-CA10 comes close to the target SA-CA10 (hereunder, referred to simply as "SA-CA10 feedback control").

As shown in FIG. 3, in the SA-CA10 feedback control, the target SA-CA10 is set in accordance with the engine operating condition (more specifically, the target air-fuel ratio, the engine speed and the intake air flow rate). The measured SA-CA10 is calculated for each cycle in the respective cylinders. Further, in the SA-CA10 feedback control, as one example, PI control is used to adjust the fuel injection amount so that a difference between the target SA-CA10 and the measured SA-CA10 is eliminated. In the PI control, using a difference between the target SA-CA10 and the measured SA-CA10 as well as a predetermined PI gain (proportional gain and integral gain), a correction amount for the fuel injection amount is calculated in accordance with the size of the difference and the size of an integrated value thereof. A correction amount that is calculated for each cylinder is reflected in the basic fuel injection amount of the cylinder that is the object of adjustment. As result, the fuel injection amount to be supplied in the next cycle at the cylinder is adjusted (corrected) by the SA-CA10 feedback control.

According to the SA-CA10 feedback control, in a cylinder in which a measured SA-CA10 that is less than the target SA-CA10 is obtained, correction is executed that decreases the fuel injection amount to be used in the next cycle to thereby make the air-fuel ratio leaner and increase the measured SA-CA10. Conversely, in a cylinder in which a measured SA-CA10 that is greater than the target SA-CA10 is obtained, correction is executed that increases the fuel injection amount to be used in the next cycle to thereby make the air-fuel ratio richer and decrease the measured SA-CA10.

According to the SA-CA10 feedback control, by utilizing SA-CA10 that is a parameter that has a high correlation with the air-fuel ratio, the air-fuel ratio during lean-burn operation can be controlled to a target value (target air-fuel ratio). Consequently, by setting the target SA-CA10 to a value corresponding to an air-fuel ratio in the vicinity of a lean combustion limit, the air-fuel ratio can be controlled in the vicinity of the lean limit. By this means, low fuel consumption and low NOx emissions can be realized.

2. Feedback Control of Spark Timing Utilizing CA50

The optimal spark timing (so-called "MBT (minimum advance for the best torque) spark timing") changes according to the air-fuel ratio. Therefore, if the air-fuel ratio changes as a result of the SA-CA10 feedback control, the MBT spark timing will also change. On the other hand, CA50 at a time that the MBT spark timing is obtained substantially does not change with respect to the air-fuel ratio in the lean air-fuel ratio range. Therefore it can be said that, by adopting, as a target CA50, CA50 at a time that the MBT spark timing is obtained, and correcting the spark timing so that a difference between the measured CA50 and the target CA50 is eliminated, the spark timing at a time of lean-burn operation can be adjusted to the MBT spark timing without being affected by a change in the air-fuel ratio as is described above. Therefore, according to the present embodiment a configuration is adopted that, during lean-burn operation, together with the SA-CA10 feedback control, also executes feedback control that adjusts the spark timing so that the measured CA50 comes close to the target CA50 (hereunder, referred to simply as "CA50 feedback control").

As shown in FIG. 3, in the CA50 feedback control, the target CA50 for making the spark timing the MBT spark timing is set to a value that is in accordance with the engine operating condition (more specifically, the target air-fuel ratio, the engine speed and the intake air flow rate). Note that, the term "CA50 feedback control" used herein is not necessarily limited to control that controls the spark timing so as to obtain the MBT spark timing. That is, the CA50 feedback control can also be used in a case where a spark timing other than the MBT spark timing is adopted as a target value, such as at so-called a time of retarded combustion. In such a case, for example, in addition to the above described engine operating condition, the target CA50 can be set so as to change in accordance with a target ignition efficiency (index value indicating a degree of divergence of the target value from the MBT spark timing).

The measured CA50 is calculated for each cycle in the respective cylinders. Further, in the CA50 feedback control, as one example, PI control is used to correct the spark timing relative to the basic spark timing so that a difference between the target CA50 and the measured CA50 is eliminated. The basic spark timing is previously stored in the ECU 40 as a value that is in accordance with the engine operating condition (mainly, the intake air flow rate and engine speed). In the PI control, using a difference between the target CA50 and the measured CA50 as well as a predetermined PI gain (proportional gain and integral gain), a correction amount of the spark timing is calculated that is in accordance with the size of the difference as well as the size of an integrated value of the difference. A correction amount that is calculated for each cylinder is reflected in the basic spark timing for the target cylinder. By this means, the spark timing (target spark timing) to be used in the next cycle at the cylinder is adjusted (corrected) by the CA50 feedback control.

A value of the air-fuel ratio at the lean combustion limit changes upon receiving the influence of the spark timing. More specifically, for example, when the spark timing is being retarded relative to the MBT spark timing, the value of the air-fuel ratio at the lean combustion limit moves to the rich side in comparison to when being controlled at the MBT spark timing. If the SA-CA10 feedback control is executed without taking into consideration the above described influence of the spark timing on the value of the air-fuel ratio at the lean combustion limit, there is a concern that misfiring will occur in a case where the air-fuel ratio deflects to a value on the lean side due to the SA-CA10 feedback control. Therefore, according to the present embodiment, as a preferred embodiment of the SA-CA10 feedback control, a configuration is adopted in which the SA-CA10 feedback control is performed only in a combustion cycle in which the CA50 feedback control is in a sufficiently converged state (that is, a state in which the spark timing comes sufficiently close to the MBT spark timing). Further, in order to favorably ensure the execution frequency of the SA-CA10 feedback control when performing the SA-CA10 feedback control in such a situation, according to the present embodiment a configuration is adopted in which the response speed of the CA50 feedback control is made higher than the response speed of the SA-CA10 feedback control. Such a setting of the response speed can be realized, for example, by making the PI gain to be used in the CA50 feedback control larger than the PI gain to be used in the SA-CA10 feedback control.

Note that, the SA-CA10 feedback control and the CA50 feedback control are executed for each cylinder in the above described situation. Although the internal combustion engine 10 of the present embodiment includes the in-cylinder pressure sensor 30 in each cylinder, in the case of an internal combustion engine having a configuration in which, for example, an in-cylinder pressure sensor is provided in only one representative cylinder, feedback control of the fuel injection amount and the spark timing of all the cylinders may be performed utilizing the measured SA-CA10 and the measured CA50 that are based on the in-cylinder pressure obtained from the single in-cylinder pressure sensor.

[Evaluation of Measured Data for MFB Using Reference Data, and Countermeasure According to Evaluation Result]
(Necessity of Evaluating Measured Data for MFB)

A waveform of measured data for MFB changes according to the combustion state (specifically, whether or not satisfactory combustion is performed) or the environment surrounding the internal combustion engine 10 (for example, the temperature environment). Therefore, if measured data for MFB can be appropriately analyzed on board, a change in the combustion state or environment can be ascertained and engine control that serves as a countermeasure to the change can be appropriately performed. Further, if reference data to serve as a standard in the aforementioned analysis is provided, it can be said that the aforementioned change can be more appropriately ascertained. That is, if the combustion is satisfactory (normal), the measured data for MFB will have a high correlation with the reference data. However, if a change arises in the combustion state or environment, the measured data will diverge from the reference data. Consequently, if the degree of correlation between the measured data and reference data can be evaluated, a change in the combustion state or the like can be ascertained.

Therefore, according to the present embodiment, in order to ensure that analysis of measured data as described above can be accurately performed on board, reference data for MFB that is to be adopted as a standard is generated on board. Furthermore, it is preferable that a configuration is adopted so that the reference data to be used to evaluate the measured data for MFB can be generated simply and accurately and with a small calculation load. Further, even under a satisfactory combustion state, a waveform of measured data for MFB changes according to the engine operating condition (mainly, the intake air flow rate, engine speed and air-fuel ratio). Therefore, it is necessary for the reference data to be capable of reflecting changes in the MFB waveform according to the engine operating condition.

(Overview of Method for Creating Reference Data for MFB)

Figure 5:
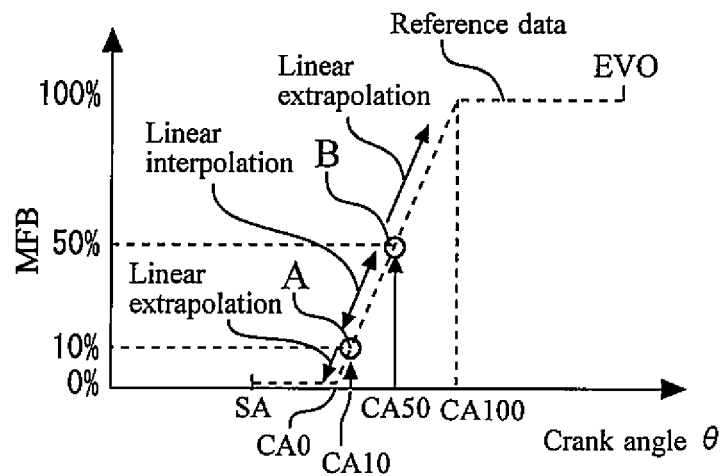
FIG. 5 is a view for describing a method for creating reference data for MFB according to the first embodiment of the present invention.

FIG. 5 is a view for describing a method for creating reference data for MFB according to the first embodiment of the present invention. FIG. 5 represents an xy-plane (hereunder, referred to as "MFB-θ plane") that takes the crank angle θ as an x-coordinate value and the mass fraction burned MFB as a y-coordinate value.

As described above referring to FIG. 3, the target CA50 that is the target value for the CA50 feedback control is determined as a value that is in accordance with the engine operating condition (target air-fuel ratio, engine speed and intake air flow rate). The target SA-CA10 that is the target value of the SA-CA10 feedback control is likewise determined as a value that is in accordance with the engine operating condition. If operating at a time of lean-burn operation in which the CA50 feedback control is executed, a command value (target spark timing) of the spark timing SA in each combustion cycle is determined as a value in which the CA50 feedback control that is based on the basic spark timing that is in accordance with the engine operating condition has been reflected. The value of CA10 can be calculated based on the target SA-CA10 and the target spark timing that are calculated in this manner. However, since this CA10 itself is not a direct control target value of the aforementioned SA-CA10 feedback control, hereunder, the CA10 in question is referred to as "specified CA10". Note that, it is assumed that the target SA-CA10 and target CA50 are set as values in a standard temperature environment (for example, 20° C.).

CA50 is a crank angle at a time that MFB becomes 50%, and CA10 is a crank angle at a time that MFB becomes 10%. Consequently, if the value of the target CA50 and the value of the specified CA10 are determined, a point A and a point B at which the target CA50 and the specified CA10 are located, respectively, on the MFB-θ plane shown in FIG. 5 are naturally determined. In order to evaluate the degree of correlation of measured data for MFB, it is necessary for the reference data to have, without omission, data that serves as a pair for each data item of the measured data that is acquired for each predetermined crank angle.

For the aforementioned purpose, according to the present embodiment a configuration is adopted in which linear interpolation and linear extrapolation are performed based on the two points A and B, and reference data is generated for MFB within a crank angle period from the combustion start point CA0 to the combustion end point CA100. Further, with respect to reference data for a crank angle period prior to CA0, reference data is generated as data for which MFB is 0%, and with respect to reference data for a crank angle period after CA100, reference data is generated as data for which MFB is 100%. Reference data for MFB is generated in this manner according to the present embodiment. Further, a waveform which the generated reference data traces is a waveform that is illustrated by a broken line in FIG. 5.

(Evaluation of Degree of Correlation of MFB Data Using Cross-correlation Function)

According to the present embodiment, to evaluate the measured data for MFB, a "correlation index value $I_R$" that shows the degree of correlation between the reference data and the measured data for MFB is determined. According to the present embodiment, a cross-correlation function is used as a preferred method for calculating the correlation index value $I_R$. Calculation of a cross-correlation coefficient R using a cross-correlation function is performed using the following equation (4).

$$R = \Sigma f_{a \sim b}(\theta) g_{a \sim b}(\tau_\theta - \theta) \quad (4)$$

Where, in the above equation (4), θ represents the crank angle. Further, $\tau_\theta$ is a variable that represents a relative deviation in a crank angle axis direction with respect to two waveforms that are objects for evaluation of the degree of correlation (according to the present embodiment, waveforms for reference data and measured data for MFB). A function $f_{a \sim b}(\theta)$ corresponds to reference data for MFB that is a set of discrete values that exists for each predetermined crank angle. A function $g_{a \sim b}(\tau_\theta - \theta)$ corresponds to measured data for MFB that, likewise, is a set of discrete values. More specifically, (a~b) indicates a section on the crank angle axis in which these functions $f_{a \sim b}(\theta)$ and $g_{a \sim b}(\tau_\theta - \theta)$ are respectively defined. The section (a~b) corresponds to a crank angle period (hereunder, referred to as "calculation period α") in which reference data and measured data exist that are objects for calculation of the cross-correlation coefficient R (in other words, objects for evaluation of the degree of correlation) in the reference data and measured data for MFB. A prior period α1 and a latter period α2 that are specific examples of a calculation period α that is used in the present embodiment are described later. Note that, in a case where measured values of the specified fraction combustion points CAα (according to the present embodiment, CA10 and CA50) that are used in the engine control are not included in the measured data for MFB that is calculated based on measured data of the in-cylinder pressure, a configuration may be adopted in which such a measured value is determined by interpolation based on adjacent measured data, and after also determining a value on the reference data side that serves as a counterpart in a pair with the measured value, the pair of values are included in the objects for evaluating the degree of correlation.

Performance of a convolution operation using equation (4) is accompanied by an operation that, by varying the variable $\tau_\theta$ within a predetermined range, consecutively calculates the cross-correlation coefficient R while causing the entire waveform of the measured data for MFB within the calculation period (α) to move little by little in the crank angle direction (horizontal axis direction of the waveform of the reference data for MFB shown in FIG. 5) while keeping the waveform of the reference data fixed. A maximum value $R_{max}$ of the cross-correlation coefficient R in the course of this operation corresponds to the cross-correlation coefficient R at a time that two waveforms are closest to each other overall, and can be expressed as shown in the following equation (5). The correlation index value $I_R$ used in the present embodiment is not the maximum value $R_{max}$ itself, but rather is a value obtained by performing predetermined normalization processing on the cross-correlation coefficient $R_{max}$ The term "normalization processing" used here refers to processing that is defined so that $R_{max}$ shows a value of 1 at a time that the two waveforms (reference data waveform and measured data waveform) are completely matching, and since this processing itself is known, a detailed description thereof is omitted here.

$$R_{max} = \max(R) = \max(\Sigma f_{a \sim b}(\theta) g_{a \sim b}(\tau_\theta - \theta)) \quad (5)$$

The correlation index value $I_R$ calculated by the aforementioned calculation processing becomes 1 (maximum) in a case where the two waveforms completely match, and progressively approaches zero as the degree of correlation between the two waveforms decreases. Note that, in a case where the correlation index value $I_R$ exhibits a minus value, there is a negative correlation between the two waveforms, and the correlation index value $I_R$ exhibits a value of −1 in a case where the two waveforms are completely inverted. Accordingly, the degree of correlation between reference data and measured data for MFB can be ascertained on the basis of the correlation index value $I_R$ that is obtained as described above. Note that, utilization of a cross-correlation function in the present embodiment is an operation that takes the same kind of data, namely MFB data, as an object and compares measured data thereof with reference data (that is, the ideal MFB data). Accordingly, it is considered that the cross-correlation function utilized in this case can be said to be substantially an auto-correlation function.

Note that, although according to the present embodiment a configuration is adopted in which, as described above, the maximum value of a value obtained by normalizing the cross-correlation coefficient R is used as the correlation index value $I_R$, a "correlation index value" according to the present application may also be the maximum value $R_{max}$ of the cross-correlation coefficient R that is not accompanied by predetermined normalization processing. However, the correlation index value (that is, the maximum value $R_{max}$ in a case that is not accompanied by normalization processing does not simply increase as the degree of correlation increases, but rather the relation described hereunder exists between the size of the maximum value $R_{max}$ and increases/decreases in the degree of correlation. That is, the degree of correlation increases as the maximum value $R_{max}$ increases, and the degree of correlation becomes highest (that is, the two waveforms completely match) when the maximum value $R_{max}$ becomes a certain value X. Further, when the maximum value $R_{max}$ increases to a value greater than the value X, the degree of correlation decreases as the maximum value $R_{max}$ increases. Accordingly, in the case of using the maximum value $R_{max}$ as it is as the "correlation index value" without normalization processing, a determination as to whether or not the "correlation index value" is less than a "determination value" can be performed by the following processing. That is, in a case where the maximum value $R_{max}$ deviates from within a predetermined range that is centered on the value X, it can be determined that "the correlation index value is less than the determination value" and, conversely, in a case where the maximum value $R_{max}$ falls within the aforementioned predetermined range, it can be determined that "the correlation index value is greater than or equal to the determination value".

(Engine Control as Countermeasure in Accordance with MFB Data Evaluation Result)

According to the present embodiment, the degree of correlation between measured data and reference data for MFB is evaluated for each combustion cycle in each cylinder with reference data generated by the above method. Hereunder, the form of a change in measured data that is shown as one example in the present embodiment will be described referring to FIG. 6 and FIG. 7.

Figure 6:
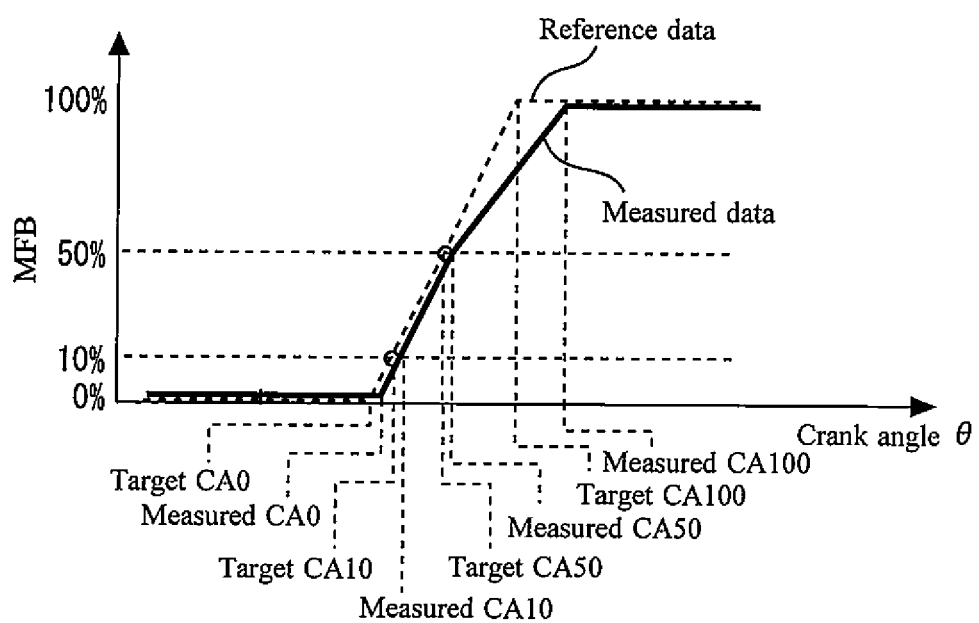
FIG. 6 is a view in which an example of a waveform of measured data for MFB in which a divergence arises relative to a waveform of reference data due to excessive cooling loss is schematically represented.

FIG. 6 is a view in which an example of a waveform of measured data for MFB in which a divergence arises relative to a waveform of reference data due to excessive cooling loss is schematically represented. At a time that the internal combustion engine 10 is operated under an extremely low temperature such as immediately after start-up in a cold district, the cooling loss is excessive in comparison to when the internal combustion engine 10 is operated in a standard temperature environment. As shown in the example illustrated in FIG. 6, the influence of such excessive cooling loss noticeably appears in measured data in the second half period of combustion (CA50-CA100). More specifically, the aforementioned influence sometimes also appears in the first half period of combustion (CA0-CA50). However, the influence of the cooling loss appears to a greater degree in the second half period than in the first half period. Consequently, the degree of correlation of the measured data relative to the reference data is lower in the second half period than in the first half period. Further, the manner in which the aforementioned influence appears in the second half period is not necessarily limited to appearing in data for a period from and after the vicinity of the measured CA50 as in the example illustrated in FIG. 6, and may sometimes appear in data for a period from and after the vicinity of a specified fraction combustion point that is a little later than the measured CA50 (for example, the measured CA80).

Figure 7:
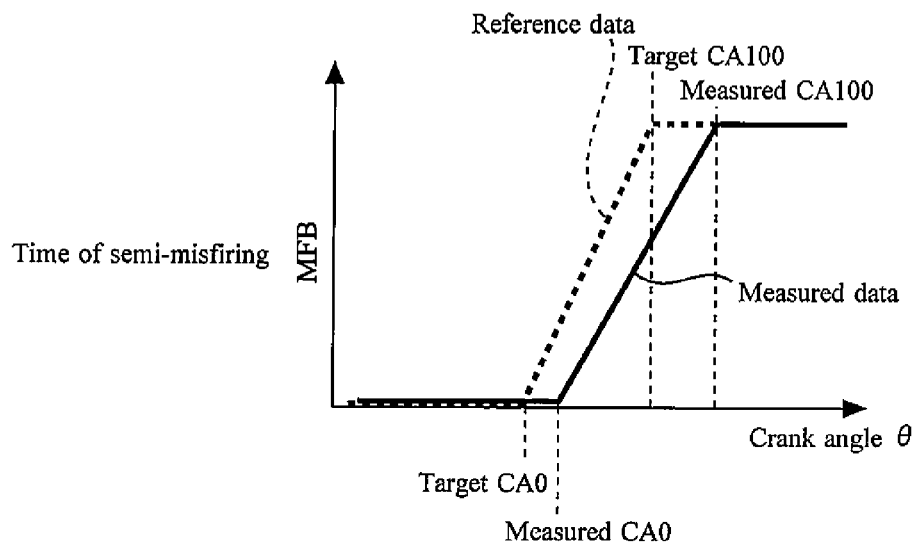
FIG. 7 is a view in which an example of a waveform of measured data for MFB in which a divergence arises relative to a waveform of reference data due to the occurrence of semi-misfiring or misfiring is schematically represented.
Figure 7:
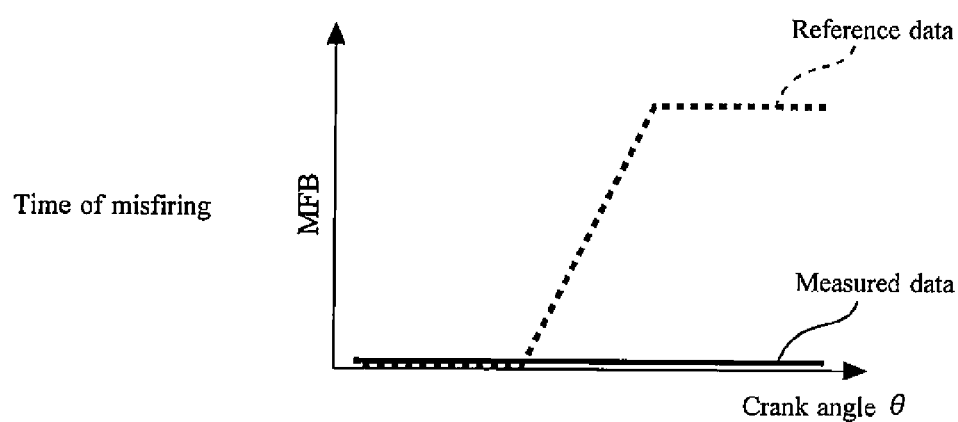

FIG. 7 is a view in which an example of a waveform of measured data for MFB in which a divergence arises relative to a waveform of reference data due to the occurrence of semi-misfiring or misfiring is schematically represented. Here, the term "semi-misfiring" refers to combustion in which flame propagation ceases in the process of combustion heat being generated and thus the engine misfires and a flame is not sufficiently formed. Further, the term "complete misfiring" (hereunder, referred to simply as "misfiring") refers to misfiring that occurs without the air-fuel mixture igniting. In comparison to a waveform of reference data in a satisfactory combustion state that is adopted as a standard, in a waveform of measured data for MFB in a case where semi-misfiring occurs, as shown in FIG. 7, the start of combustion is delayed and the manner in which the MFB data rises is gradual. On the other hand, in a case where misfiring occurs, because heat generation does not occur, the measured data for MFB transitions at a value of 0% for MFB. Note that, in practice, even when misfiring occurs, the influence of noise that is superimposed on the output of the in-cylinder pressure sensor 30 sometimes appears in the waveform of the measured data for MFB, and the waveform of the measured data for MFB in such a case fluctuates in the vicinity of 0% MFB. As described above, the measured data in a case where semi-misfiring or misfiring occurs has a low correlation with the reference data over the entire combustion period of the reference data.

As will be understood from the comparison results between the measured data and reference data for MFB that are shown in FIG. 6 and FIG. 7, it can be said that by only evaluating the degree of correlation between the two kinds of MFB data in the second half period of combustion, it is difficult to accurately distinguish whether a divergence in the measured data is due to cooling loss or is due to semi-misfiring/misfiring.

Therefore, according to the present embodiment, to evaluate the degree of correlation between the two kinds of MFB data in the first half period of combustion, a configuration is adopted in which a correlation index value $I_{R1}$ is calculated that takes as an object the prior period α1 that is a calculation period including the first half period as well as the periphery thereof. In addition, in order to evaluate the degree of correlation between the two kinds of MFB data in the second half period of combustion, a configuration is adopted in which a correlation index value $I_{R2}$ is calculated that takes as an object the latter period α2 that is a calculation period including the second half period as well as the periphery thereof.

In addition, according to the present embodiment, in a case where although the correlation index value $I_{R2}$ that relates to the latter period α2 is less than a predetermined determination value $I_{Rth}$, the correlation index value $I_{R1}$ that relates to the prior period α1 is greater than or equal to the determination value $I_{Rth}$, it is determined that the measured data for MFB varies relative to the reference data due to an excessive cooling loss. Further, in such a case, a configuration is adopted so that predetermined engine warm-up control is performed to raise the temperature of the internal combustion engine 10.

Further, according to the present embodiment, in a case where the correlation index value $I_{R2}$ that relates to the latter period α2 is less than the predetermined determination value $I_{Rth}$ and the correlation index value $I_{R1}$ that relates to the prior period α1 is also less than the determination value $I_{Rth}$, it is determined that the measured data for MFB varies relative to the reference data due to semi-misfiring/misfiring. Further, in such a case, a configuration is adopted so that predetermined misfiring suppression control for suppressing the occurrence of misfiring (including semi-misfiring) is performed.

(Specific Processing in First Embodiment)

Figure 8:
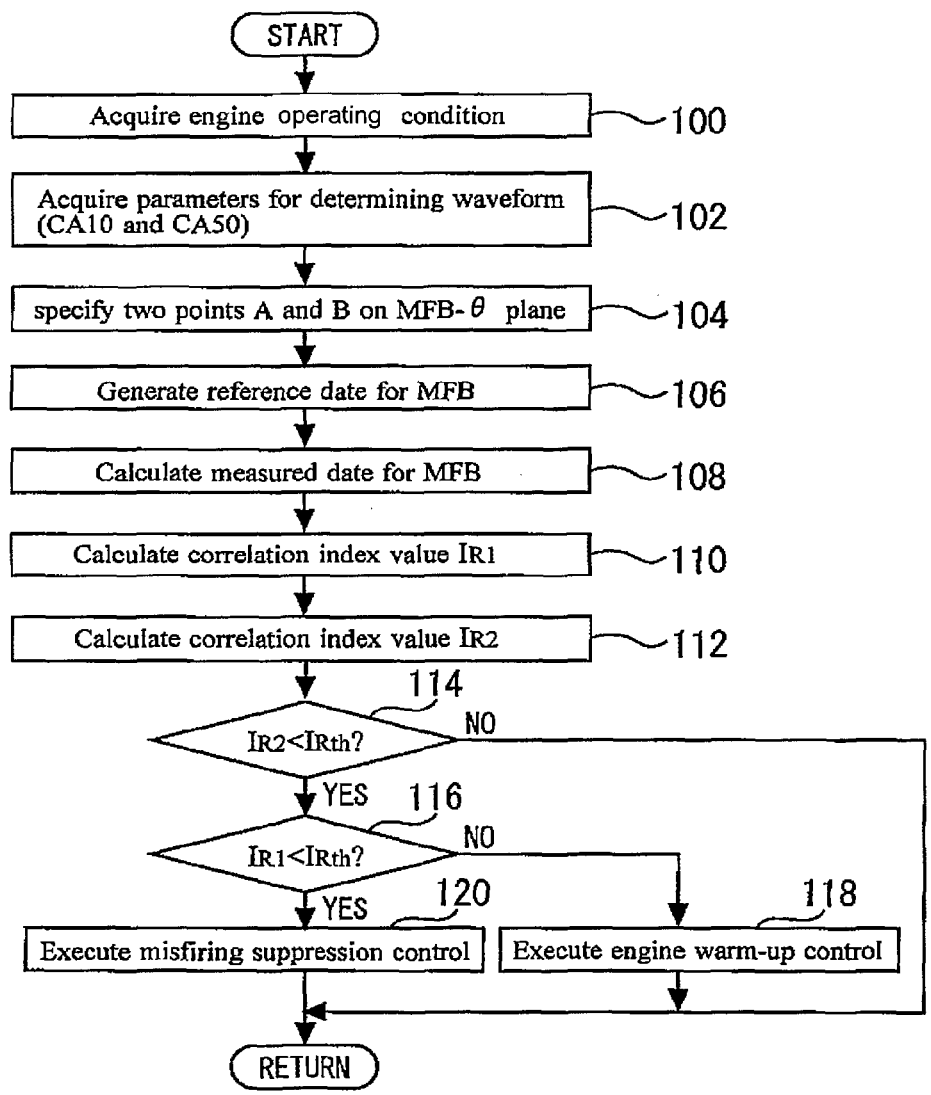
FIG. 8 is a flowchart illustrating a routine that is executed in the first embodiment of the present invention.

FIG. 8 is a flowchart illustrating a routine that the ECU 40 executes in the first embodiment of the present invention. Note that, during lean-burn operation, the present routine is started at a timing at which the opening timing of the exhaust valve 22 has passed in each cylinder, and is repeatedly executed for each combustion cycle.

In the routine shown in FIG. 8, first, in step 100, the ECU 40 acquires the current engine operating condition. The term "engine operating condition" used here refers to mainly the engine speed, the intake air flow rate and the air-fuel ratio. The engine speed is calculated using the crank angle sensor 42. The intake air flow rate is calculated using the air flow sensor 44. The air-fuel ratio is an air-fuel ratio that is adopted as a target at the time of lean-burn operation.

Next, the ECU 40 proceeds to step 102 and acquires the target CA50 and the specified CA10 as parameters for determining a waveform of the reference data for MFB. More specifically, the ECU 40 acquires the target CA50 that is separately calculated for executing CA50 feedback control. Further, the ECU 40 acquires the target SA-CA10 that is separately calculated for executing SA-CA10 feedback control, and a target spark timing that corresponds to a command value of the final spark timing in which CA50 feedback control has been reflected. Subsequently, the ECU 40 calculates the specified CA10 by adding the target spark timing to the target SA-CA10.

Here, if, for example, the air-fuel ratio changes to the lean side, the slope of the MFB waveform in the combustion period decreases. It is necessary for the reference data for MFB to correspond to changes in the MFB waveform that are in accordance with such engine operating condition. Because the target CA50 is determined as a value that is in accordance with the engine operating condition, the influence of the engine operating condition is already factored into the target CA50. Likewise, the influence of the engine operating condition is already factored into the target SA-CA10. Further, as described above, the target SA-CA10 and the target CA50 are set assuming use of the internal combustion engine 10 in a standard temperature environment (for example, 20° C.). Therefore, the influence of the temperature surrounding the internal combustion engine 10 is also already factored into the target SA-CA10 and the target CA50. The basic spark timing that serves as a base for calculating the target spark timing is determined as a value in accordance with the engine operating condition (intake air flow rate and engine speed). Further, a change in the MBT spark timing that accompanies a change in the air-fuel ratio is dealt with by correcting the spark timing by means of the CA50 feedback control. Consequently, with respect to also the target spark timing in which the CA50 feedback control has been reflected, it can be said that the influence of the engine operating condition is already factored therein. Accordingly, with respect to also the specified CA10 that is determined depending on the target SA-CA10 and the target spark timing, it can be said that the influence of the engine operating condition is already factored therein. Thus, since the influence of the engine operating condition is already factored into the target CA50 and the specified CA10, with regard to also the reference data that is generated based on the target CA50 and the specified CA10, it can be said that a change in the MFB waveform that is due to the engine operating condition is naturally already factored therein.

Next, the ECU 40 proceeds to step 104. In step 104, the ECU 40 performs processing for specifying two points A and B on the MFB-θ plane using the target CA50 and the specified CA10 acquired in step 102.

Next, the ECU 40 proceeds to step 106. In step 106, reference data for MFB at points other than the two points A and B is generated based on the two points A and B. Specifically, first, reference data within a crank angle period from the combustion start point CA0 to the combustion end point CA100 is generated as follows. That is, the reference data for the crank angle period (CA10 to CA50) between point A and point B is generated by linear interpolation based on the two points A and B. On the other hand, reference data for crank angle periods (CA0 to CA10, and CA50 to CA100) outside the crank angle period specified between point A and point B is generated by linear extrapolation based on the two points A and B. Further, as described above, the reference data for a crank angle period prior to CA0 is generated as data in which MFB is 0%, and the reference data for a crank angle period after CA100 is generated as data in which MFB is 100%.

Next, the ECU 40 proceeds to step 108. In step 108, measured data for MFB is calculated in accordance with the above described equation (3) based on measured data for the in-cylinder pressure that is acquired using the in-cylinder pressure sensor 30 in the current combustion cycle.

Next, the ECU 40 proceeds to step 110. In step 110, the correlation index value $I_{R1}$ is calculated using the aforementioned equation (4) by taking as the object the data that is inside the prior period α1 among the reference data and the measured data for MFB that are calculated in steps 106 and 108, respectively. Here, as one example, the prior period α1 is a crank angle period from the spark timing SA to the crank angle that is less than CA50.

Next, the ECU 40 proceeds to step 112. In step 112, the correlation index value $I_{R2}$ is calculated using the aforementioned equation (4) by taking as the object the data that is inside the latter period α2 among the reference data and the measured data for MFB that are calculated in steps 106 and 108, respectively. Here, as one example, the latter period α2 is a crank angle period from CA50 (including CA50) to EVO. Note that, CA50 that is used to define the prior period α1 and the latter period α2 is specified utilizing the "reference data" for MFB.

Next, the ECU 40 proceeds to step 114. In step 114, the ECU 40 determines whether or not the correlation index value $I_{R2}$ relating to the latter period α2 that is calculated in step 112 is less than the determination value $I_{Rth}$. The determination value $I_{Rth}$ is set in advance as a value with which it is possible to distinguish a divergence that is in the measured data relative to the reference data in the prior period α1 and that is caused by semi-misfiring. In a case where a change that is caused by semi-misfiring arises, in comparison to a case where a change in the measured data that is due to cooling loss caused by, the measured data for the prior period α1 diverges significantly relative to the reference data. Further, in a case where a change that is due to misfiring arises, in comparison to a case where a change that is due to semi-misfiring arises, the measured data for the prior period α1 diverges significantly relative to the reference data. Accordingly, by setting the determination value $I_{Rth}$ in, for example, the manner described above, it is possible to isolate the cause of a change in the measured data that is taken as the object in the present routine.

In a case where the result determined in step 114 is negative ($I_{R2} \geq I_{Rth}$), the ECU 40 swiftly ends the processing in the current combustion cycle. On the other hand, in a case where the result determined in step 114 is affirmative ($I_{R2} < I_{Rth}$), that is, in a case where it can be determined that the degree of correlation of the measured data for MFB for the latter period α2 with respect to the reference data is low, the ECU 40 proceeds to step 116. In step 116, the ECU 40 determines whether or not the correlation index value $I_{R1}$ that relates to the prior period α1 that is calculated in step 110 is less than the determination value $I_{Rth}$.

If the result determined in step 116 is negative ($I_{R2} < I_{Rth}$, and $I_{R1} \geq I_{Rth}$), the ECU 40 proceeds to step 118. In this case, although the degree of correlation between the measured data for MFB in the latter period α2 and the reference data is low, it can be determined that the measured data for MFB in the prior period α1 has a high degree of correlation with the reference data. Therefore, in this case, the ECU 40 determines that the measured data for the MFB has changed due to cooling loss, and executes engine warm-up control. Here, as one example of the engine warm-up control, an operation to increase the fuel injection amount is executed. More specifically, a correction amount for increasing the fuel injection amount by means of this engine warm-up control is added to a fuel injection amount that is determined in a manner that reflects a correction by the SA-CA10 feedback control. According to this control, since the air-fuel ratio changes to the theoretical air-fuel ratio side by increasing the fuel injection amount under lean-burn operation, the heat release amount is increased and warming up of the engine can be promoted. Reflection of the engine warm-up control into a fuel injection amount is performed in the next cycle for the cylinder that is the object of the current determination. However, since a change in the temperature environment that is a cause of cooling loss becoming excessive is not a situation that is specific to the aforementioned cylinder, reflection of the control in question is not limited to the aforementioned cylinder, and may be started from a cylinder for which a fuel injection amount is initially commanded after execution of the current determination. The engine warm-up control is continued until the result determined in step 114 becomes negative.

On the other hand, if the result determined in step 116 is affirmative ($I_{R2} < I_{Rth}$, and $I_{R1} < I_{Rth}$), the ECU 40 proceeds to step 120. In this case, it can be determined that the degree of correlation of the measured data for MFB with respect to the reference data is low in both the latter period α2 and the prior period α1. Consequently, in this case, the ECU 40 determines that the measured data for MFB has changed due to semi-misfiring or misfiring, and executes misfiring suppression control. Here, as one example of misfiring suppression control, an operation to increase the fuel injection amount is executed. More specifically, a correction amount for increasing the fuel injection amount by means of this misfiring suppression control is added to a fuel injection amount that is determined in a manner that reflects a correction by the SA-CA10 feedback control. Misfiring can be suppressed more reliably by performing misfiring suppression control in this manner in addition to control of the air-fuel ratio by the SA-CA10 feedback control. Reflection of the misfiring suppression control in a fuel injection amount is performed in the next cycle for the cylinder that is the object of the current determination. The misfiring suppression control is continued until the result determined in step 114 becomes negative.

According to the processing of the routine illustrated in FIG. 8 that is described above, reference data for MFB can be generated based on the target CA50 and the specified CA10. The target CA50 is a control target value that is utilized in the CA50 feedback control that is one of the engine controls that the internal combustion engine 10 performs. The specified CA10 is a specified fraction combustion point that is defined depending on the target SA-CA10 that is utilized in the SA-CA10 feedback control that is similarly one of the engine controls and depending on the target spark timing that is determined by means of the CA50 feedback control. Advantages of the method for generating reference data for MFB utilizing the target CA50 and the specified CA10 that are parameters with such characteristics will be described hereunder in contrast with a known method for generating MFB data.

(Advantages of Method for Generating Reference Data for MFB in First Embodiment)

One example of a known method for generating MFB data is a method utilizing a Wiebe function. This method is one that attempts to mathematize combustion. However there is the following problem with this method. That is, the calculation load of the ECU is high because the amount of calculation increases. When it is attempted to express a combustion waveform (MFB waveform) with greater accuracy using a Wiebe function, it is necessary to appropriately set various parameters to be used in the Wiebe function. Therefore, it is necessary to take into consideration various engine operating condition parameters such as the intake air flow rate, the engine speed, the air-fuel ratio and the spark timing, as well as the combustion temperature and the gas flow velocity in a cylinder. Further, when it is attempted to calculate a combustion waveform using such a large number of engine operating condition parameters, the mathematical formula becomes more complicated. Consequently, the calculation load increases.

Another problem with the known method for generating MFB data is that it is difficult to ensure the accuracy of the generated MFB data. The reason is that mathematization of combustion is in itself difficult, and it is difficult to extract all the factors that influence combustion. For the above reasons, it cannot be said that the known method for generating MFB data is suitable for implementation in comparison to the method of the present embodiment that has the advantages described below.

In contrast, for the following reasons, it can be said that the method for generating reference data for MFB of the present embodiment is simple and can generate reference data that is more appropriate as a comparison object for evaluating the degree of correlation of the measured data for MFB.

That is, first, with respect to the target CA50, a value is determined for the engine control that is taken as a premise. Further, the specified CA10 is defined depending on the target SA-CA10 for which a value is determined similarly to the target CA50. That is, it is not necessary for the target CA50 and the specified CA10 that are parameters used as a basis for generating reference data in the present embodiment to be defined in advance for the purpose of generating reference data, and complicated calculation is also not required when acquiring these values on board. It can thus be said that these values are parameters that are easily acquired. Further, based on the target CA50 and the specified CA10, reference data can be generated by performing simple calculations, namely linear interpolation and linear extrapolation. Consequently, in comparison to the aforementioned known method, according to the method of the present embodiment, the amount of calculation can be considerably reduced, and the calculation load of the ECU 40 is extremely low. Therefore, it can be said that the present method is more suitable for implementation.

An MFB waveform has a characteristic such that the waveform rises rectilinearly in the main combustion period (from CA10 to CA90). Accordingly, it can be said that, by generating reference data in the main combustion period using linear interpolation and linear extrapolation, reference data can be acquired in a simple manner while appropriately grasping a characteristic of the MFB waveform. Note that, in a stricter sense, the combustion waveform is not a waveform that bends at single points at the combustion start point CA0 and the combustion end point CA100 as schematically represented in FIG. 5 and the like, but rather bends in a slightly rounded shape in the crank angle period from CA0 to around CA10 and the crank angle period from CA90 to around CA100 (see FIG. 2). However, these crank angle periods are short periods in terms of the entire combustion period, and furthermore it can be said that the fact that the MFB waveform is slightly rounded in such crank angle periods does not exert a large influence from the viewpoint of comparing the degree of correlation of the MFB data. Consequently, it can be said that, with respect to these crank angle periods also, it is sufficient to generate the reference data by linear extrapolation, as in the present embodiment.

Next, a reason why it can be said that reference data that is more appropriate as a comparison object for evaluating a degree of correlation of measured data for MFB can be generated by the method for generating MFB data of the present embodiment will be described. The target CA50 is a target value of the CA50 feedback control that is taken as a premise. Further, in the SA-CA10 feedback control, the fuel injection amount is controlled so that the measured SA-CA10 becomes the target SA-CA10, and the spark timing is also controlled to the target spark timing that is determined by the CA50 feedback control. Consequently, it can be said that CA10 is indirectly controlled by execution of the SA-CA10 feedback control and the CA50 feedback control so as to become the specified CA10 that is defined depending on the target SA-CA10 and the target spark timing. In this respect, it can be said that the specified CA10 corresponds to an indirect control target value. Based on the foregoing, it can be said that, in a case where the SA-CA10 feedback control and the CA50 feedback control are being executed, by means of these controls the fuel injection amount and the spark timing are controlled so that a measured waveform of MFB comes close to a waveform of reference data that is generated based on the target CA50 and the specified CA10.

Further, as described above, because the influence of the engine operating condition is already factored into the target CA50 and the specified CA10, changes in the MFB waveform due to the engine operating condition are also already factored into the reference data that is generated based on the target CA50 and the specified CA10. For the above reasons, it can be said that, according to the method of the present embodiment, by generating a waveform of reference data directly based on the target CA50 and the specified CA10 it is possible to uniquely determine, based on the target CA50 and the specified CA10, a combustion waveform (in other words, an ideal combustion waveform) that is the target of the engine control that is taken as a premise (here, the SA-CA10 feedback control and the CA50 feedback control). Further, according to the present embodiment, MFB data for such kind of ideal combustion waveform is adopted as reference data. Therefore, in comparison to a case using MFB data generated by the known method that is described above, the method of the present embodiment can generate reference data that is more appropriate as a comparison object for evaluating the degree of correlation of measured data for MFB.

(Identification of Factor Causing Change in Measured Data for MFB, and Effect Relating to Countermeasure in Accordance with Identified Factor)

According to the processing of the aforementioned routine, the degree of correlation between the measured data and reference data for MFB can be suitably evaluated using reference data having the advantages described above. Further, it is possible to utilize the evaluation result to identify whether the factor causing the change in the measured data is an excessive enlargement in the cooling loss or is semi-misfiring/misfiring. More specifically, the aforementioned identification can be accurately performed utilizing characteristics of changes in the measured data that depend on differences between the factors.

Subsequently, according to the processing of the aforementioned routine, engine warm-up control or misfiring suppression control can be performed as a countermeasure that is in accordance with the identified factor. That is, engine control is performed based on the degree of correlation between the measured data and reference data for MFB.

Further, in a case where the aforementioned engine warm-up control is continuously executed, measured data that diverges as shown in FIG. 6 relative to the reference data comes closer to the reference data with the passage of time. According to the above described routine, when the degree of correlation increases as a result of the divergence being eliminated, the result determined in step 114 is negative and the engine warm-up control is ended. Because an evaluation result for MFB data can be acquired in each combustion cycle, it can be said that, according to the engine warm-up control based on the evaluation result, it is possible to determine the timing for completing engine warm-up at an earlier stage in comparison to a case where the timing is indirectly determined based on the temperature of the engine cooling water. This leads to an improvement in fuel efficiency.

[Modification of First Embodiment]

In the above described first embodiment, reference data for a combustion period (from CA0 to CA100) is generated based on the target CA50 and the specified. CA10. However, the two specified fraction combustion points that are utilized to generate reference data for a combustion period are not limited to CA50 and CA10 as long as the specified fraction combustion points are used in the engine control that is taken as a premise, and may be arbitrary specified fraction combustion points (for example, CA90) selected from CA0 to CA100. However, as described above, in a strict sense, an MFB waveform changes rectilinearly in the main combustion period (from CA10 to CA90), and hence it is preferable that the two specified fraction combustion points that serve as the basis for generating the reference data are selected from among specified fraction combustion points from CA10 to CA90.

Further, in the above described first embodiment, reference data for the entire combustion period from CA0 to CA100 is generated using linear interpolation and linear extrapolation based on the target CA50 and the specified CA10. However, as described above, strictly speaking, an MFB waveform in a crank angle period from CA0 to CA10 and an MFB waveform in a crank angle period from CA90 to CA100 become slightly rounded. Therefore, reference data for at least one of these crank angle periods may be generated in a manner that reproduces a rounded waveform using, for example, a quadratic function, and without using linear interpolation or linear extrapolation.

Furthermore, in the above described first embodiment, both linear interpolation and linear extrapolation are used to generate reference data for MFB in a combustion period. However, depending on the positions of the two specified fraction combustion points that are adopted as a basis for generating the reference data, one of linear interpolation and linear extrapolation will be used. For example, in a case of generating reference data that takes the entire combustion period as an object based on CA0 and CA100, only linear interpolation is used. Further, although it is considered that, in reality, the possibility of the following two points being selected is low, if two items of reference data corresponding to two adjoining items of measured data in a combustion period are selected as the aforementioned two specified fraction combustion points, only linear extrapolation is used.

Further, in the above described first embodiment, the target CA50 and the specified CA10 are used as the basis for generating reference data. However, depending on the two specified fraction combustion points that are used in the engine control that is taken as a premise, the two values may each be a control target value, or the two values may each be a specified fraction combustion point that is determined depending on a control target value, that is, the two values may each be an indirect control target value.

Furthermore, in the above described first embodiment, a cross-correlation function is used to calculate a correlation index value that shows the degree of correlation between measured data and reference data for MFB. However, the term "degree of correlation between measured data and reference data for mass fraction burned" used in the present application is not necessarily limited to a value calculated using a cross-correlation function. That is, the "degree of correlation" may be, for example, a value obtained by adding together the squares of differences (a so-called "residual sum of squares") between the measured data and reference data for MFB at the same crank angles when taking a predetermined calculation period as an object. In a case of the residual sum of squares, the value decreases as the degree of correlation increases.

Here, it can be said that, for the following reason, utilization of a cross-correlation function is superior in comparison to utilization of a residual sum of squares. That is, in a waveform of measured data for MFB, slight deviations relative to a waveform of reference data that are caused by variations in combustion can arise between combustion cycles. Even in a case where such deviations in the waveform of measured data arise, the residual sum of squares is calculated as a value of a certain size. That is, the residual sum of squares sensitively reacts to minute deviations in measured data that are caused by variations in combustion. Consequently, in some cases it is difficult to accurately detect the above described change in the combustion states or in the environment in distinction from such variations in combustion.

On the other hand, as described in the foregoing, calculation of a cross-correlation function includes an operation that successively calculates the cross-correlation coefficient R while moving the entire waveform of the measured data for MFB inside the calculation period α little by little in the crank angle direction (horizontal axis direction of the waveform of the reference data for MFB shown in FIG. 5) in a state in which the waveform of the reference data is fixed. A maximum value of values after normalizing the cross-correlation coefficients R that are obtained in the course of this calculation is adopted as the correlation index value $I_R$ in the combustion cycle that is the calculation object. Therefore, even in a case where although the shape itself of the MFB data is equal to that of the reference data, the measured data deviates slightly relative to the reference data in the crank angle direction due to combustion variations, according to the cross-correlation function the correlation index value $I_R$ is calculated in a state in which the measured data is moved and is substantially correlated with the reference data. Therefore, the method utilizing a cross-correlation function is less susceptible to the influence of variations in combustion in comparison to the method utilizing a residual sum of squares, and hence it can be said that a characteristic of a change in the waveform of measured data that is due to a change in the combustion state or in the environment can be detected more accurately by utilizing a cross-correlation function.

Further, in the above described first embodiment, in the processing for identifying a factor that causes a change in the measured data for MFB, a common determination value $I_{Rth}$ is used for both the correlation index value $I_{R1}$ that relates to the prior period and the correlation index value $I_{R2}$ that relates to the latter period. However, a determination value that is used in the aforementioned processing need not be a common determination value, and separate determination values may be used for the correlation index value $I_{R1}$ that relates to the prior period and for the correlation index value $I_{R2}$ that relates to the latter period. Accordingly, a "first determination value" and a "second determination value" used in the present application may be the same value or may be different values. Likewise, a "third determination value" and a "fourth determination value" may also be the same value or may be different values. This similarly applies with respect to a relation between the "first determination value" and the "third determination value", and a relation between the "second determination value" and the "fourth determination value".

Figure 9:
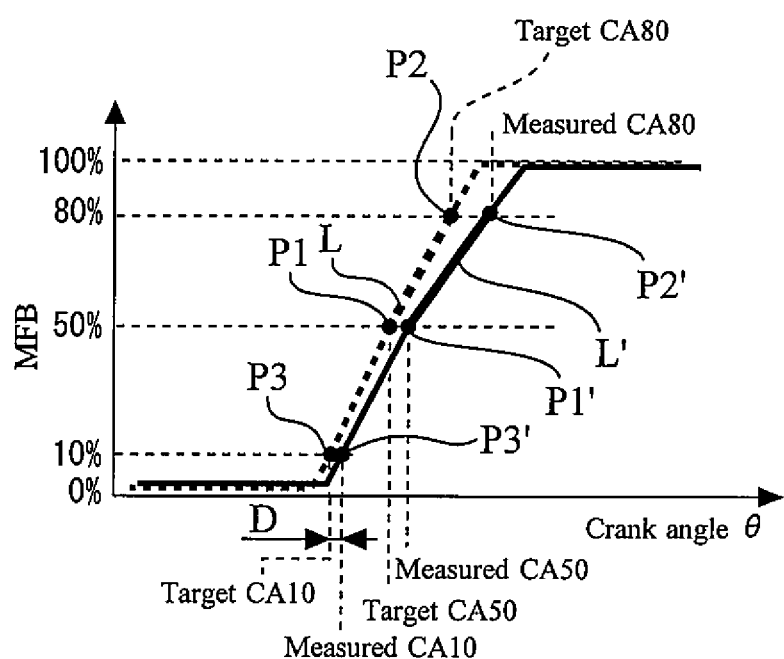
FIG. 9 is a view for describing an example in which a degree of correlation of MFB data is evaluated at three specified fraction combustion points and a change in the measured data for MFB that is caused by an excessive increase in cooling loss is determined.

In the present application, it is preferable that a "degree of correlation between measured data and reference data for mass fraction burned" be evaluated taking as an object a waveform of data for three or more consecutive points using a technique such as the above described cross-correlation function or the residual sum of squares. However, a method for determining a "degree of correlation" for grasping a change in a waveform of measured data that is caused by an excessive increase in cooling loss may be, for example, the following method that is described referring to FIG. 9. FIG. 9 is a view for describing an example in which a degree of correlation of MFB data is evaluated at three specified fraction combustion points and a change in the measured data for MFB that is caused by an excessive increase in cooling loss is determined. CA10 and CA50 that are used in the above described two feedback controls and CA80 are utilized as the three specified fraction combustion points used for this determination. Further, to evaluate the degree of correlation between measured data and reference data on the second half side of combustion, a straight line L that passes through two points P1 and P2 of the reference data at CA50 and CA80 on the MFB-θ plane and a straight line L' that passes through two points P1' and P2' of the measured data at CA50 and CA80 are calculated. Further, to evaluate the degree of correlation between measured data and reference data on the first half side of combustion, a distance D between a point P3 of the reference data at CA10 and a point P3' of the measured data at CA10 is calculated. In addition, by determining whether or not the distance D is less than or equal to a predetermined value, it is determined whether the degree of correlation between the measured data and the reference data for MFB on the first half side (corresponds to "prior period" according to the present application) of combustion is greater than or equal to a first determination value. Further, by determining whether or not the amount of a variation in the slope of the straight line L' relative to the slope of the straight line L is greater than or equal to a predetermined value, it is determined whether or not the degree of correlation between the measured data and reference data for MFB on the second half side of combustion (corresponds to "latter period" according to the present application) is lower than a second determination value. In a case where it is determined that the distance D is less than or equal to the aforementioned predetermined value and the aforementioned amount of a variation relating to the straight lines L and L' is greater than or equal to the aforementioned predetermined value, it is determined that a change in the measured data that is due to an excessive increase in cooling loss is arising, and engine warm-up control is therefore executed.

In the above described first embodiment a configuration is adopted that utilizes an evaluation result with regard to the degree of correlation of the MFB data to distinguish a factor that causes a change in measured data for MFB between an excessive increase in cooling loss and semi-misfiring/misfiring, and engine control (engine warm-up control or misfiring suppression control) is performed as a countermeasure in accordance with a result of distinguishing the factor. However, specific examples of engine control based on a degree of correlation of MFB data in the present application are not limited to the aforementioned examples. That is, apart from the above described examples, it is sufficient that a change in the combustion state or in the environment be ascertained by grasping the characteristic of a change in measured data for MFB, and that the engine control serves as a countermeasure with respect to the change.

Further, in the above described first embodiment, increasing the fuel injection amount is described as an example of engine warm-up control. However, "engine warm-up control" according to the present application is not limited to the aforementioned example. That is, for example, in a case where a mechanism is provided that can vary a circulation flow rate of engine cooling water, or in a case where a pump that circulates engine cooling water is an electric motor-driven pump, the aforementioned engine warm-up control may be control that decreases the circulation flow rate of engine cooling water.

Further, in the above described first embodiment, increasing the fuel injection amount is described as an example of misfiring suppression control. However, "misfiring suppression control" according to the present application is not limited to the aforementioned example, and, for example, in a case where an ignition device that is capable of adjusting the ignition energy is provided, the misfiring suppression control may be control that increases the ignition energy.

In the above described first embodiment a configuration is adopted in which a crank angle period (calculation period $\alpha$) that is an object for calculation of the correlation index values $I_{R1}$ and $I_{R2}$ is divided into the prior period $\alpha 1$ and the latter period $\alpha 2$ in a manner that takes CA50 of the reference data as a boundary. However, the "prior period" and "latter period" according to the present application are not limited to periods that correspond to a first half period and a second half period of combustion that is divided by taking CA50 as a boundary. That is, a boundary between the "prior period" and the "latter period" may be an arbitrary third specified fraction combustion point other than CA50 as long as the boundary is located within a range that makes it possible to distinguish among the possible causes of a change in the measured data for MFB between an excessive increase in cooling loss and semi-misfiring/misfiring. Further, in the first embodiment the spark timing SA is used as the start point of the prior period $\alpha 1$, and the opening timing EVO of the exhaust valve 22 is used as the end point of the latter period $\alpha 2$. In the present application, the start point of the "prior period" is not limited to the spark timing SA, and it is sufficient that the start point is at or after a closing timing IVC of the intake valve 20. On the other hand, the end point of the "latter period" according to the present application is not limited to EVO, and as long as the case is one in which a crank angle timing at which it can be judged that combustion is definitely ended is determined in advance in consideration of variations in combustion and the like, the end point of the "latter period" may be taken as such a crank angle timing. In addition, the "prior period" according to the present application need not include a crank angle period prior to the combustion period, and likewise the "latter period" need not include a crank angle period after the combustion period.

Further, although in the above described first embodiment an example is described in which the degree of correlation of MFB data is evaluated for each cylinder using a cross-correlation function, a configuration may also be adopted in which evaluation of the degree of correlation of MFB data is executed for an arbitrary representative cylinder as the object. Engine control based on the degree of correlation of MFB for the representative cylinder may then be performed taking all the cylinders as an object.

Further, in the above described first embodiment, an example is described in which the fuel injection amount is adjusted by means of the SA-CA10 feedback control. However, an object of adjustment by the SA-CA10 feedback control that is utilized for combustion control during lean-burn operation is not limited to a fuel injection amount, and may be an intake air flow rate or ignition energy. Note that, if the object of adjustment is the fuel injection amount or the intake air flow rate, the feedback control can be positioned as air-fuel ratio control. Further, a specified fraction combustion point CA$\alpha$ that is used in the present feedback control is not necessarily limited to CA10, and may be another combustion point. However, with regard to application to the present feedback control, it can be said that CA10 is better in comparison to the other combustion points for the following reasons. That is, in a case where a combustion point within the main combustion period (CA10 to CA90) that is after CA10 is utilized, the crank angle period that is obtained will be affected to a large degree by parameters (EGR rate, intake air temperature and tumble ratio and the like) that affect combustion when the flame is spreading. That is, a crank angle period obtained in this case is not one that is focused purely on the air-fuel ratio, and is vulnerable to external disturbances. Further, as described above, an error is liable to arise at combustion points around the combustion start point CA0 and the combustion end point CA100 due to the influence of noise that is superimposed on an output signal from the in-cylinder pressure sensor 30. The influence of such noise decreases as the combustion point moves away from the combustion start point CA0 and the combustion end point CA100 toward the center side of the combustion period. In consideration of these points, it can be said that CA10 is best.

Furthermore, in the above described first embodiment, a configuration is adopted in which, at a time of lean-burn operation accompanied by implementation of SA-CA10 feedback control and CA50 feedback control, evaluation of the degree of correlation of MFB data is performed based on the correlation index values $I_{R1}$ and $I_{R2}$. However, on the premise that "first engine control" and "second engine control" according to the present application are performed, such evaluation is not limited to the one performed at the time of lean-burn operation, and, for example, a configuration may be adopted in which the evaluation is performed at the time of the theoretical air-fuel ratio burn operation.

Note that, in the above described first embodiment, the ECU 40 that is configured to: calculate measured data for MFB in accordance with the processing in the routine shown in FIG. 8; calculate a specified fraction combustion point CAα such as CA10 based on measured data for MFB that is calculated in accordance with the above described equation (3); execute the SA-CA10 feedback control; execute the CA50 feedback control; and execute the engine warm-up control or the misfiring suppression control in accordance with the processing in the routine shown in FIG. 8, corresponds to the "controller" according to the present application. Further, the fuel injection valve 26 and the ignition device 28 correspond to "one or a plurality of actuators" according to the present application, CA10 corresponds to "first specified fraction combustion point" according to the present application, SA-CA10 corresponds to "first parameter" according to the present application, the SA-CA10 feedback control corresponds to "first engine control" according to the present application, CA50 corresponds to "second specified fraction combustion point" according to the present application, the CA50 feedback control corresponds to "second engine control" according to the present application, the engine warm-up control and the misfiring suppression control correspond to "third engine control" according to the present application, the specified CA10 corresponds to "first target value" and "first specified fraction combustion point that is specified based on a target value of the first parameter" according to the present application, the target CA50 corresponds to "second target value" and "target value of a second specified fraction combustion point" according to the present application, a crank angle period from the spark timing SA to CA0 corresponds to "first crank angle period" according to the present application, and a crank angle period from CA100 to EVO corresponds to "second crank angle period" according to the present application. Further, CA50 in the reference data corresponds to "third specified fraction combustion point" according to the present application, the prior period α1 corresponds to "prior period that is a crank angle period including a combustion period prior to a third specified fraction combustion point" according to the present application, and the latter period α2 corresponds to "latter period that is a crank angle period including a combustion period from and after a third specified fraction combustion point" according to the present application. Further, the determination value $I_{Rth}$ corresponds to each of "first to fourth determination values" according to the present application. Note that, although the following is a different form to the first embodiment, in a case where a parameter that is defined based on CA50 (for example, SA-CA50) is used, the SA-CA50 corresponds to "second parameter" according to the present application, and in a case where a target CA10 is set for CA10 itself, the target CA10 corresponds to "target value of a first specified fraction combustion point" according to the present application. Further, in a case where, for example, a target SA-CA50 is set for the aforementioned SA-CA50 itself, a specified CA50 that is specified based on the target SA-CA50 corresponds to "second specified fraction combustion point that is specified based on a target value of the second parameter" according to the present application.

The invention claimed is:

1. A control apparatus for controlling an internal combustion engine that includes one or more actuators used for engine control, the control apparatus comprising:
an in-cylinder pressure sensor configured to detect an in-cylinder pressure;
a crank angle sensor configured to detect a crank angle; and
a controller, the controller programmed to:
calculate measured data for mass fraction burned that is synchronized with crank angle, based on an in-cylinder pressure detected by the in-cylinder pressure sensor and a crank angle detected by the crank angle sensor;
calculate a measured value for a specified fraction combustion point that is a crank angle at a time that a mass fraction burned becomes a specified fraction based on the measured data for mass fraction burned;
execute a first engine control that, based on a first specified fraction combustion point that is a crank angle at a time that a mass fraction burned becomes a first specified fraction, or based on a first parameter that is defined based on the first specified fraction combustion point, controls any one or a plurality of the one or more actuators so that the first specified fraction combustion point or the first parameter becomes a target value;
execute a second engine control that, based on a second specified fraction combustion point that is a crank angle at a time that a mass fraction burned becomes a second specified fraction, or based on a second parameter that is defined based on the second specified fraction combustion point, controls any one or a plurality of the one or more actuators so that the second specified fraction combustion point or the second parameter becomes a target value; and
execute a third engine control that, based on a degree of correlation of the measured data for mass fraction burned and reference data for mass fraction burned, controls any one or a plurality of the one or more actuators, wherein the reference date is based on an operating condition of the internal combustion engine,
wherein the reference data for mass fraction burned in at least a crank angle period from a 10% combustion point to a 90% combustion point in a combustion period is generated by at least one of linear interpolation and linear extrapolation based on a first target value and a second target value,
wherein the first target value is either a target value of the first specified fraction combustion point or the first specified fraction combustion point that is specified based on a target value of the first parameter,
wherein the second target value is either a target value of the second specified fraction combustion point or the second specified fraction combustion point that is specified based on a target value of the second parameter,
wherein in a case where a first crank angle period that is a crank angle period prior to the combustion period is included in the reference data for mass fraction burned, the reference data for mass fraction burned in the first crank angle period is data in which mass fraction burned is zero percent, and
wherein in a case where a second crank angle period that is a crank angle period after the combustion period is included in the reference data for mass fraction burned, the reference data for mass fraction burned in the second crank angle period is data in which mass fraction burned is 100 percent.

2. The control apparatus according to claim 1, wherein the first specified fraction combustion point and the second specified fraction combustion point are specified fraction combustion points within the crank angle period from the 10% combustion point to the 90% combustion point.

3. The control apparatus according to claim 1, wherein the third engine control is engine warm-up control that raises a temperature of the internal combustion engine, and is executed in a case where a degree of correlation between the measured data and the reference data for mass fraction burned in a prior period that is a crank angle period including a combustion period prior to a third specified fraction combustion point at a time that a mass fraction burned is a third specified fraction is greater than or equal to a first determination value, and a degree of correlation between the measured data and the reference data for mass fraction burned in a latter period that is a crank angle period including a combustion period from and after the third specified fraction combustion point is lower than a second determination value.

4. The control apparatus according to claim 1,
wherein the third engine control is misfiring suppression control that suppresses occurrence of misfiring, and is executed in a case where a degree of correlation between the measured data and the reference data for mass fraction burned in a prior period that is a crank angle period including a combustion period prior to a third specified fraction combustion point at a time that a mass fraction burned is a third specified fraction is lower than a third determination value, and a degree of correlation between the measured data and the reference data for mass fraction burned in a latter period that is a crank angle period including a combustion period from and after the third specified fraction combustion point is lower than a fourth determination value.

5. The control apparatus according to claim 1, wherein a correlation index value that indicates the degree of correlation is calculated using a cross-correlation function.

* * * * *